Feb. 13, 1968     S. NATELSON     3,368,872
AUTOMATIC CHEMICAL ANALYZER

Original Filed Aug. 31, 1954     4 Sheets—Sheet 1

SAMUEL NATELSON
*INVENTOR*

BY
ATTORNEY

Feb. 13, 1968 S. NATELSON 3,368,872
AUTOMATIC CHEMICAL ANALYZER
Original Filed Aug. 31, 1964 4 Sheets-Sheet 2

SAMUEL NATELSON
INVENTOR.

BY George B. August
ATTORNEY

Feb. 13, 1968    S. NATELSON    3,368,872
AUTOMATIC CHEMICAL ANALYZER
Original Filed Aug. 31, 1964    4 Sheets-Sheet 4

SAMUEL NATELSON
*INVENTOR.*

BY
ATTORNEY

United States Patent Office 3,368,872
Patented Feb. 13, 1968

3,368,872
AUTOMATIC CHEMICAL ANALYZER
Samuel Natelson, Valley Stream, N.Y., assignor to Scientific Industries, Inc., Queens Village, N.Y.
Original application Aug. 31, 1964, Ser. No. 393,096, now Patent No. 3,260,413, dated July 12, 1966. Divided and this application Feb. 14, 1966, Ser. No. 547,110
4 Claims. (Cl. 23—253)

ABSTRACT OF THE DISCLOSURE

A device for the chemical analysis of fluids automatically comprising a device for dispensing a liquid sample in the form of a drop on a tape combination, said tape combination comprising a transparent porous portion travelling with and in close contact with an absorbent tape, said absorbent tape having been impregnated with a reagent for producing a color reaction with the component of the sample sought, a transfer zone maintained at constant temperature through which the drop of sample supported on said porous tape passes and in which zone said drop and said tapes moves for a fixed period of time, the component for assay passing through said porous tape to said reagent tape, a washing station where water flows over the porous tape to remove the spent sample, a drying zone where warm dry air dries the tape combination and a readout zone where a beam of collimated monochromatic light passes through said tape combination and is recorded by means of a photocell attached to a recorder.

---

The present application is a division filed under Rule 147 of Ser. No. 393,096 filed on Aug. 31, 1964, now Patent No. 3,260,413, which is a continuation-in-part of U.S. patent application Ser. No. 234,019 filed Oct. 30, 1962 and now Patent No. 3,219,416, U.S. patent application Ser. No. 216,845 filed Aug. 14, 1962 and now Patent No. 3,261,686, U.S. patent application Ser. No. 170,084 filed Jan. 31, 1962 and now Patent No. 3,216,804. The foregoing applications in turn relate back to U.S. patent application No. 14,894, filed Mar. 14, 1960, now U.S. Patent No. 3,036,893 and, Ser. No. 216,845 relates back to U.S. patent application No. 155,882 now abandoned.

This invention relates to the chemical analysis of substances, and more particularly to a method and apparatus for the automatic continuous analysis of substances.

The chemical laboratory is often faced with the problem of the analysis of large numbers of samples. This is time consuming and tedious to the operator, often resulting in error due to the large number of samples being assayed and the close attention one must pay to each step of the procedure. The fatigue which sets in often results in errors being introduced. In many cases, several operators are required to finish the work of the day.

To relieve this condition, instruments have been introduced which automatically sample the material to be analyzed, add reagents, and go through elaborate processes both as regards procedure and instrumentation to perform the analyses automatically. These devices are cumbersome, elaborate and are expensive to produce. Thus, only certain laboratories can afford the expense of these instruments. In addition, the operator must be skilled in handling the equipment as regards setting up the instrument and adjusting it when something goes wrong. These instruments require appreciable amounts of material for analysis and do not lend themselves readily to adaptation for the analysis of ultramicro samples of the order of microliters. Furthermore, in these instruments, the sample and reagents are pumped in the instrument in liquid form so that an appreciable quantity of sample is needed.

In the aforementioned U.S. Patent No. 3,036,893, it has been shown that small quantities of samples could be processed, treated and analyzed using, flat mediums such as paper tapes. The present invention is closely related to the basic concept of U.S. Patent No. 3,036,893 but includes simplified chemical analysis procedures.

It is therefore an object of the present invention to provide means for chemical analysis using flat mediums.

And, it is also an object of the present invention to provide a device which does not require liquid reagents.

Another object of the invention is to provide a device which is easy to operate.

Still another object of the invention is to provide a device which permits multiple analysis of several constituents simultaneously.

This invention also contemplates providing a device which is inexpensive to manufacture.

It is also the purpose of the invention to provide a system which can handle ultramicro samples.

The invention likewise contemplates providing a device which is rapid and capable of turning out a result in as sort a time as twenty seconds or even less, once the instrument has started to run.

Yet another object of the invention is to provide a device which is versatile, without changing to elaborate equipment during intermediate stages of the operation.

Furthermore, the invention contemplates providing a device which is reliable, having a minimum number of easily repairable parts.

Among the further objects of the present invention is the provision of a device which can do highly colored solutions, e.g., hemoglobin, when the color does not readily pass through a membrane.

It is contemplated that the system herein described can be used for single and multiple determinations.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example, preferred embodiments of the inventive idea.

Figure 3:
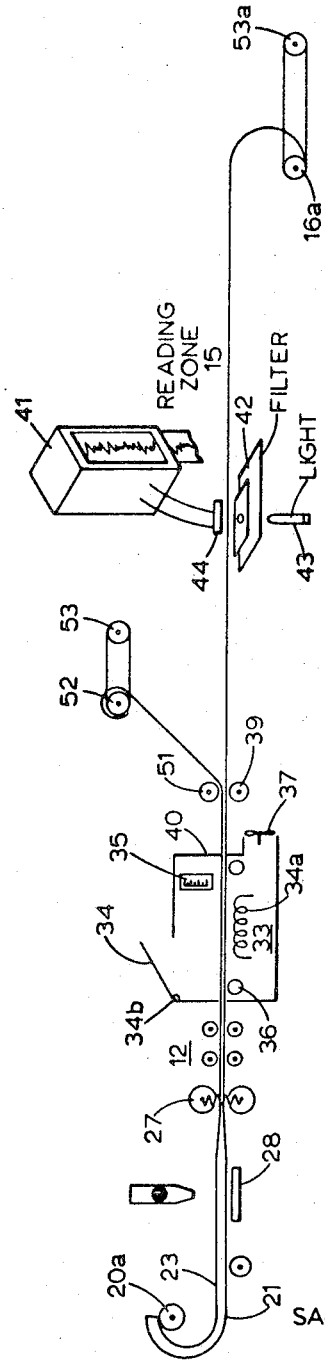
Figure 2:
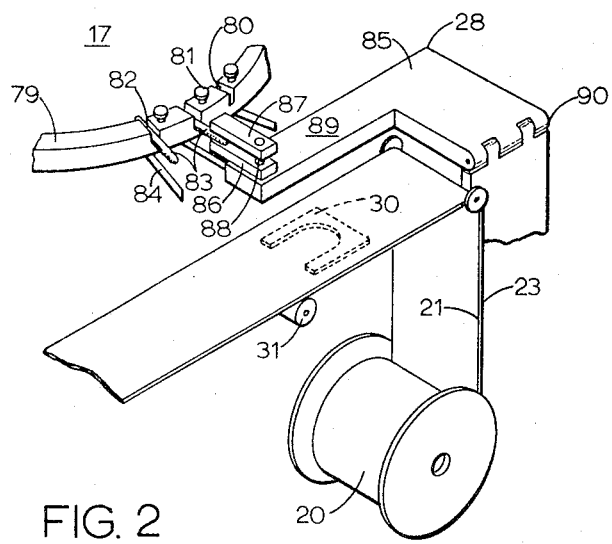
FIGURE 2 is a perspective view of an embodiment of a sample dispenser which may advantageously be used with the other apparatus herein described.
Figure 2A:
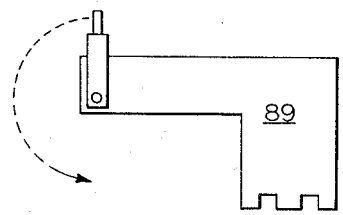
Figure 2B:
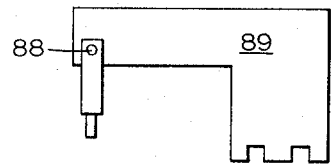
Figure 2C:
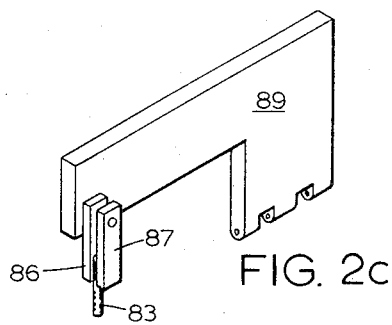
Figure 3A:
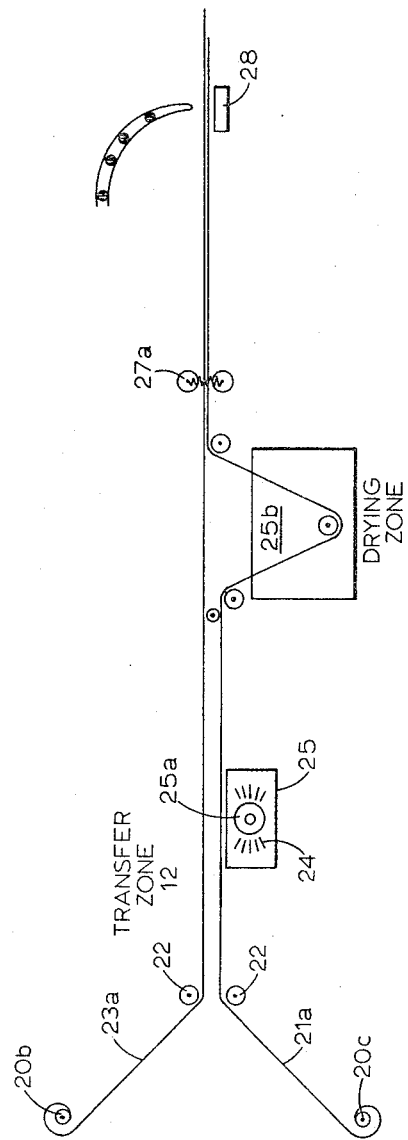
Figure 4:
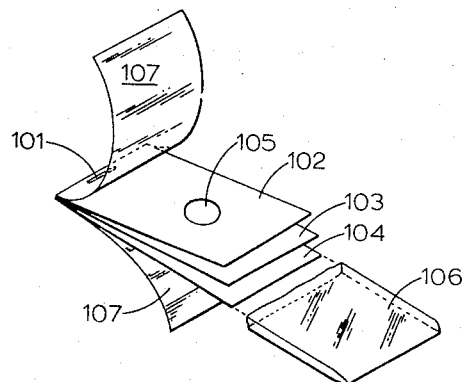
Figure 5:
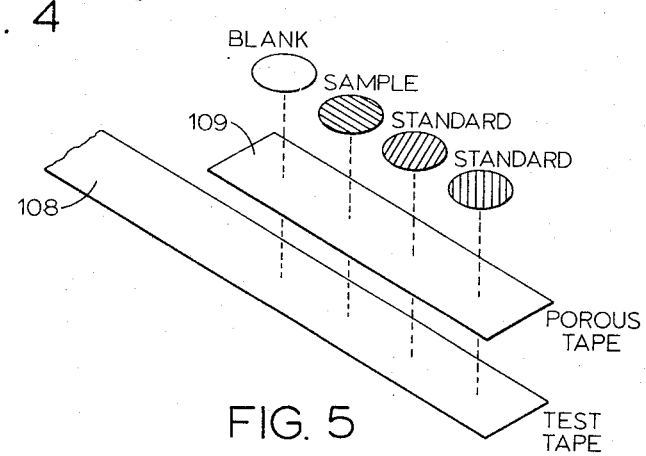
Figure 6A:
Figure 6C:
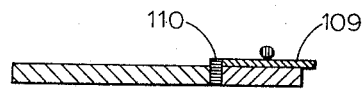
Figure 6B:
Figure 6D:
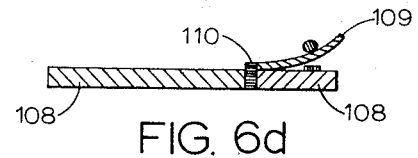

FIGURES 2a, 2b, and 2c are illustrations of the operation of a portion of the sample dispenser shown in FIGURE 2 but at different time periods;

FIGURE 3 is a longitudinal schematic view of another embodiment of the present invention;

FIGURE 3a presents a portion of a longitudinal schematic view of a modification of the embodiment illustrated in FIGURE 3;

FIGURE 4 depicts an embodiment of the present invention useful for single determinations;

FIGURE 5 illustrates another embodiment of the present invention useful for a single determination; and FIGURES 6a, 6b, 6c, 6d illustrate the use of the embodiment of FIGURE 5 in making a single determination.

The invention in its broadest aspects contemplates a system for the treatment of microquantities of samples, e.g., drops or droplets of blood, urine and other body fluids so that quantitative and qualitative determinations can be made, and ailments can be diagnosed therefrom.

Generally speaking, the present invention provides for a flat test medium or tape to which the sample will be transferred and upon which tape the sample or samples will be subjected to treatment for analysis; and, a porous flat medium or tape through which the sample to be analyzed will have to pass in order to reach the test tape. The porous tape may be bonded to the test tape by means of pressure or by spraying a solution containing a plastic such as cellulose acetate or cellulose nitrate and allowing the solution to evaporate to form a thin porous film on the test tape.

When the porous tape is bonded to the test tape to form a combined tape, the sample may be analyzed by means of an apparatus having an input zone where the sample is placed on the porous portion of the bonded tape in drop quantities; a transfer zone 12 where the sample is transferred through the porous portion of the tape, to the test portion preferably at constant temperature, a treating zone 13 where the combined tape is subjected to treatment such as applying heat to develop a color or stop an enzymatic reaction, or where reagents may be sprayed on the test tape to develop a color; for analyzing the sample, and may include a wash station 14a to remove excess sample and/or excess reagent and a drying station 14b a reading zone 15 where the treated sample is read, and a terminal zone 16 which includes means to take up the combined tape 18, e.g., a take-up reel. Driving means are provided to drive the tapes either at a constant rate or intermittently.

The reason for using a plural tape arrangement will become apparent in connection with the explanation of the operation of the device given after the following detailed description of the apparatus.

The samples to be tested or analyzed are contained in a dispenser 17 a preferred embodiment of which is depicted in FIGURE 2 of the drawing. The principal requirement of the dispenser is that it can either drop or blow small measured quantities of the sample at a desired place on the apparatus.

In accordance with one embodiment of the invention, the sample from the dispenser 17 (shown in FIG. 2) will be received on combined tape 18 which preferably will have been treated with a reagent. Combined tape 18 will be contained on a payoff, e.g., tape payoff roller 20. For convenience, no supporting means are shown for any of the numerous rollers or reels herein described, it being of course well understood that such supporting means are provided.

To receive the sample, there is provided a sample receiving station 28, having guide means 29, and it is towards this sample receiving station 28 that the sample from dispenser 17 will be dropped. In order to avoid any contamination of the sample which will be placed on the sample receiving tape, a horseshoe shaped recess 30 may be provided in the sampling plate at the spot where the sample is placed on the tape. Thus, in this embodiment, the plate serves only as a support, and the sample itself never touches the plate. To further insure accuracy in the placing of the sample on the tape, idler roller 31 may be provided. This will prevent the tape from having any crimps or bumps and aids in the uniformity of the sample spot placed on the tape.

Figure 1:
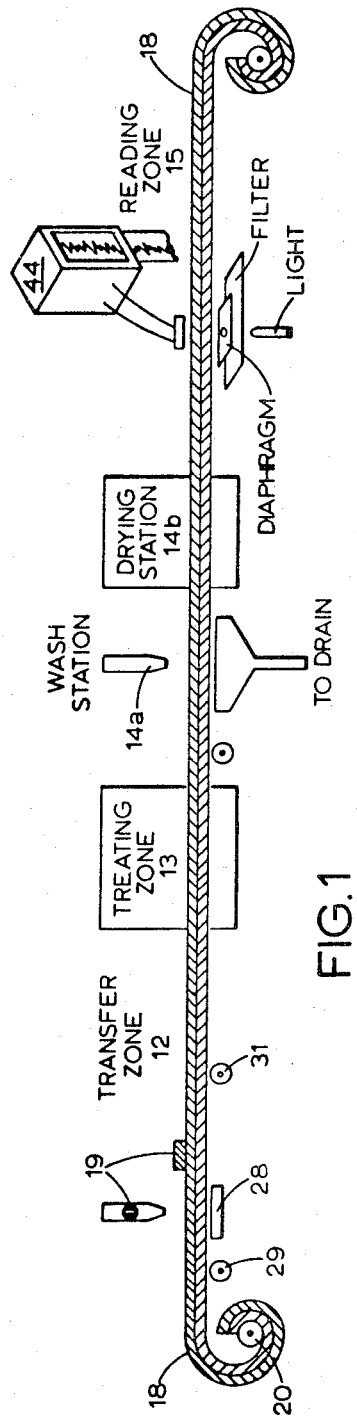
FIGURE 1 is a longitudinal schematic view of one embodiment of the apparatus contemplated herein.

In the embodiment shown in FIGURE 1, the combined tape 18 travels continuously from the input zone towards the terminal zone. After the sample spot has been placed on combined tape 18 and the tape has traveled through the transfer zone at least some of the sample will have passed to the test portion of the tape. The tape then enters the treating zone 13. Here the sample may be heated to accelerate a chemical reaction or stop an enzymatic reaction. In some cases an additional reagent may be sprayed on to the test tape to develop a color. Excess sample and/or reagent can be washed off at a wash station 14a and the tape may be dried at a drying station 14b. The tape is read by passing a thin pencil of light through the spot in the reading zone 15, and finally is wound on a reel at the terminal zone. Instead of the single combined tape arrangement of FIGURE 1, it is advantageous for some purposes to use a separate test tape 21 and porous medium 23. The two tapes may be made to adhere by simple pressure and then wound on the same pay-off 20a. The test tape 21 may contain a reagent. With regard to porous medium 23, the degree of porosity will depend on the sample tested and on the treatment to which the sample is subjected. For proteins, total lipids, mucoproteins etc. where larger molecules are being assayed, the porosity of the tape must be increased to allow these molecules to go through. Likewise, the degree of porosity of the tape may also be used as an effective means for separating components of the samples being tested. In this connection, a porous tape made of cellophane, cellulose acetate or cellulose nitrate has been found particularly useful for certain hospital laboratory ananlysis, e.g., sugar, urea, calcium, uric acid, creatinine, and amino acids where it is desired to prevent proteins from reaching the test tape.

After leaving the pay-off 20a, the tapes pass to the input zone where the sample is deposited on the porous tape.

These two tapes, i.e., the porous tape 23, and the test tape 21 are all directed towards a pair of spring loaded rollers 27 located at the entrance of the transfer zone 12. The function of these rollers is to bring the tapes into close contact so that the sample can be transferred to the test tape through the porous tape. Just as the sample receiving plate 28 recesses so as to avoid contamination of the sample, so do the spring loaded rollers 27 likewise have a recess. The sample passes between the recesses.

The tapes now enter a treating zone 13 which is completely enclosed in enclosure 33, preferably made of transparent plastic, and advantageously having a door 34. This door is to facilitate adjustment or repairs and can be a simple affair held by hinges 34b. Naturally the entire enclosure need not be transparent, just so long as the operator can see what goes on inside the enclosure and make certain that the device is functioning properly. The treating zone illustrated in the drawing comprises a chamber 33 in which there is provided heating means 34a. Advantageously, a thermometer 35 may also be provided in chamber 33. The chamber is preferably transparent, or partially so. To increase the travel time in this zone, the construction of the chamber may be elongated and may have one or more idlers to change the course of travel of the test tape through the zone. Additional equipment may also be provided in this zone, either in the chamber as shown in the drawing, such as a fan 37 and air vents all of which of course may be adjustable. A sprayer may be provided for spraying a reagent on to the test tape. In designing the equipment, the idler rollers 36 in the zone may be removable and so disposed that the addition or removal of these rollers in the zone fixes the travel time in the zone each particular disposition of these rollers in the zone causing the tape to travel in the zone a predetermined time period. It has also been found particularly useful to have a washing station in the zone adapted to wash the excess reagent or sample from the test tape. The test tape 21 leaves the treating zone along an idler 39 at zone exit 40. The test tape now enters the reading zone 15 where the results of the test or analysis will be read on a densitometer 41. An appropriate light filter 42 acting in combination with a light source 43 is on one side of the tape, and a photo cell 44 is on the other side. The action of the light on the densitometer will be plotted on graph paper which shows the peaks made by a pen. This type of densitometer is known in the art.

At the treating zone exit another idler 51 is provided to facilitate the separation of the tapes. Here the porous tape is separated from the test tape. Porous tape take-up reel 52 is provided for this purpose and the tapes are moved by a motor or belting arrangement 53. In this manner the sample remaining is removed and discarded.

The test tape has now served its purpose and has come to the end of its road. It therefore enters the terminal zone. The test tape finally winds up on takeup reel 16a shown in the drawing as being rotated by belting 53a. The drive for the device should be such that by proper adjustment, it should be both continuously driving the rollers or intermittently driving the rollers. Usually, when the sample from dispenser 17 is being dropped on the tape over the sample receiving plate, or even when blown or dropped thereon by the operator, the tapes are moving at the intermittent rate, allowing the sample to drop on the tape while the tape is not moving. However, after one or a series of samples have been dropped, the operator may wish to move the tape along for some distance before starting a new series of tests with other samples. It is thus preferable for the operator to be able to advance the tape continuously by pressing a button or switch which will change the intermittent drive to continuous drive.

In the apparatus of FIG. 3, both the porous tape and the test tape are wound on the same pay-off. It is also possible to provide a more flexible instrument shown in FIGURE 3a, the reagent being varied with the procedure employed. Thus, the reagent can be changed instead of changing test tapes for each analysis. The porous tape 23a and the test tape 21a are wound on separate pay-offs 20b and 20c. Guide rollers 22 direct the two separate tapes. The test tape 21a passes over a reagent containing station 25 having a wick contact roller 25a. The tape moves over the roller 25a which turns. Since a reagent 24 is contained in the station container, the wick contact roller 25a brings up the reagent to the underside of the tape impregnating the tape with the reagent. The two tapes are directed to a pair of spring loaded squeeze rollers 27a and thence to the input zone where a sample is deposited on the tape from a peristaltic pump. The test tape may be dried before it contacts the porous tape by passing through a ventilated zone 25b at a controlled elevated temperature.

The apparatus of FIGURES 1, 1a, 3, 3a, can monitor the changing concentration in a batch solution. In this case the sample is delivered by a peristaltic pump which pumps specimens continually. These arrive at the porous tape in the form of drops from a narrow nozzle. The drops are spaced about an inch apart on the porous tape.

The changes in the composition of the concentration of the drops are detected at the reading station. The output from the photocell sensing means is recorded as peaks and, a continuous recording of the changing concentration is thus recorded as a series of changing peaks.

As examples of batch solutions that have been used are fermentation mixtures, blood from a cannula inserted in the artery or vein of an experimental animal or a human, plating baths, organic reactions mixtures and the like.

In connection with the devices just described, it is advantageous to have associated therewith a sample dispenser 17, preferably driven by the same driving means as are used to drive the device. The dispenser should be removable or detachable from the device to permit manually feeding the sample receiving tape. The dispenser includes circular positioning means 79 on which a plurality of radial holders 80 are mounted near the edge of the positioning means. In each holder 80, there is provided a bed 82 made of rubber or other resilient material into which a capillary tube 83 is inserted radially into the holder. The capillary tubes 83 are held in the holders 80 by means of a threaded knurled fastener 81 which is spring loaded. The spring is released by means of release means 84 which projects radially beyond the periphery of the positioning means 79. As the circular positioning means 79 turns it brings the radially disposed capillary tube into the input zone. Here, the capillary tube 83 will be seized by a clamp arrangement 85. Clamp arrangement 85 includes lower and upper clamp jaws 86 and 87 normally disposed radial to circular positioning means 79. Clamp jaws 86 and 87 are pivotly mounted by a pivot 88 on a hinged arm 89. As the release means 84 hits lower clamp jaw 86, the knurled fastener is released. Lower clamp jaw 86 moves up while upper clamp jaw 87 remains stationary clamping the capillary tube 83 in between. As shown in FIGURES 2a and 2b the capillary tube secured between the clamp jaws is first raised so as to clear the circular positioning means. The clamp holding the capillary then swings 180° with the capillary tube to a point over the horseshoe shaped recess 30. Hinged arm 89 which is normally horizontally disposed then turns on hinge 90 to the vertical position as shown in FIGURE 2c discharging the contents of the capillary tube. The hinged arm 89 then returns to the horizontal position, and the clamp jaws 86 and 87 swing back to a horizontal position. The clamp and capillary now swing back 90° to a position intermediate the tape and sample holders. The bottom clamp lowers, releasing the capillary which falls into a waste container. The open clamp now moves another 90° to be in a position to pick up the next capillary. Circular positioning means capable of holding fifty capillaries or more can be constructed. When the capillary tubes have been inserted in the horizontal position they can be rapidly filled by simply touching the sample to the tip of the capillary. It then runs right to the other end of the tube. For most tests, capillary tubes of between 0.2 to 0.5 mm. bore and capable of containing from 0.01 to 0.05 ml. are preferable. But, in some cases, capillary tubes of less than 0.1 mm. bore are used.

In practice, the operator places the capillary tubes on the circular positioning means and tightens them in place with the knurled fasteners. He then touches the liquid samples to the capillaries which fill by capillarity. When the capillaries turn 180° the end not touched to the sample eventually approaches the porous tape and deposits the sample. The capillaries need not empty but will deliver the same amount each time. The capillaries may be emptied by compressed air blowing on the upper end. In this manner the outside of the tube which holds some sample by adhesion, when the capillaries were filled, is not brought near the tapes. Thus accurate measurement is practicable without contamination.

Where single determinations are required such as on a patient in a physician's office, it is advantageous to use strips of tape prepared as individual pads shown in FIGURE 4. Here a plurality of flat mediums on tapes are shown as individual strips stapled together by a staple 101. The sample is placed on a sample receiving tape 102, then goes through a porous tape 103 onto a test tape 104 these tapes are retained sandwich fashion by staple 101. The sample receiving tape is shown with a confined spot circle 105 on the top of the tape although it may also be placed on the bottom. The test tape which usually contains a reagent is encased in a solvent-repellant polyethylene bag 106 and the entire assembly is covered by a water-repellant cover 107. The operation of this pad can best be understood from a description of the operation performed.

The patient's finger is stuck in the conventional manner and a drop of blood is taken up in a calibrated capillary or pipet such as a Sahli pipet. The outside tip of the pipet is wiped and the blood is touched to the center of the paper of the sample receiving tape strip. The blood drains on to the paper completely by capillarity and, a confined spot is advantageously used for greater accuracy, although it is not necessary for approximate results. The porous intermediate tape layer is not wetted but the bottom test tape paper strip is moistened with a reagent or already has a reagent thereon. When determinations are made, it may or may not be necessary to turn over the sample receiving tape strip paper. Very often, the sample will permeate right through the tape so that the reversal of the tape strip is unnecessary. In fact, when great accuracy is not required the sample may be deposited directly on the porous tape. The pores of the intermediate porous tape strip are controlled so that for determinations like sugar and urea, only substances of low molecular weight can pass. For protein estimation, a pore size is chosen so as to allow the proteins through but not allow the red cells to pass. For the analysis of substances such as aqueous solutions or human serum, the test tape may also be dry but impregnated with reagent. In this case, moisture is supplied from the sample. For shipment, the reagent-containing test tape may be encased in a polyethylene container so that the solvent does not evaporate, i.e., the reagent-containing test tape strip is kept in a separate bag which is torn open just before use and inserted below the intermediate porous tape. When the two-tape or three-tape strips are assembled and sold as part of a pad, the bag is torn and removed just before use.

After the blood has been placed on the sample receiving or porous tape or strip of the pad, FIGURE 4, the pad may be, for greater accuracy and sensitivity, placed in a pressing device which will press the tapes or strips in a pressing device which will press the tapes or strips together. The pressing device may include heating means, and is described in my co-pending application Serial No. 216,845 filed August 14, 1962 as hereinbefore mentioned.

The pad assembly of FIGURE 4 may be combined into a single strip as shown in FIGURE 5. This strip consists of an elongated section of absorbent test paper 108 having a porous portion 109 over the tip of the test paper. The porous portion 109 over the tip may be bonded thereto by spraying a solution containing a plastic such as cellulose acetate or cellulose nitrate and allowing the solution to evaporate to form a thin porous film on the test tape. The area under the porous portion 129 is impregnated with a reagent. A water repellant medium 110 may be placed across the tape and impregnating same to produce a confined spot as shown in FIGURES 6a to 6d. Placing a drop of sample on the porous tape will cause some of the component being assayed to permeate to the test tape producing a spot suitable for visual comparison with a standard color chart or assay by means of a densitometer as described above for the continuous procedures. The standard or standards, for visual comparison may be provided right on the tapes next to a confined spot as shown in FIGURE 5.

An alternative method is to apply the sample on the porous tape which has been pressed on to the test tape so that it adheres but allowing a portion of the porous tape to extend beyond the test tape. After a drop of sample has been applied to the porous tape and a predetermined time has been allowed for it to permeate the porous tape nad react with the test tape, the porous tape may be lifted and discarded permitting the test tape to be examined by visual comparison with a color chart or by means of the densitometer as described above for the continuous procedures for multiple samples.

Although the foregoing explanation is sufficient to understand the operation of the components of the embodiments herein contemplated, it is believed that additional explanation is required to clarify the reason for using the arrangements described, particularly the combination of the tapes. As already explained at the beginning of this patent specification, tape devices, particularly where paper tapes are employed have often not been considered suitable for quantitative chemical analysis of substances. This is because of the irregular spot formation. Obviously, the reading means, e.g., densitometer has no way of distinguishing between even and uneven spots. Furthermore, if the components of the sample drop or specimen are not properly or uniformly distributed, visual study of the curves and peaks recorded by the densitometer is impossible. If two spots containing the same components are distributed over an equal area but in a different manner, the densitometer recording device will record two different curves. The areas of each curve will be precisely the same, but the peak height of one curve will be different from the other. Electronically, both spots can be read properly and correct results obtained, but visual comparison is of course impossible.

The need for a plurality of tapes can be understood from the following observation. When a drop of water is dropped on a piece of paper which has been impregnated with a colored reagent which is water soluble, the water will spread. In so doing, it will dissolve the reagent and move it away from the center where the water has been dropped. On drying, a ring will be observed. The center of the ring will be white, where the reagent has been washed away. The outer ring will be dark where the reagent has been concentrated. For this reason, it is impractical to perform a quantitative test by dropping a test solution on a reagent paper. If attempted, one would obtain a thin ring surrounding the area of application. When sent through a densitometer, the densitomer will read in error. The center of the spot will allow too much light to go through since it is clear. The ring concentration will be underestimated since light will not pass the high concentration of color in the ring. Thus, whether there is a certain amount or whether there is twice that amount in the ring, the maximum absorption of light will have been reached and the amount will be underestimated. When the sample is applied through a porous tape with minute pores, submicroscopic droplets of test solution are evenly distributed over the reagent paper. This results in an even distribution of the sample on the reagent paper. The colored product of such a reaction, can be accurately estimated by the densitometer.

If samples of different concentrations are applied through the porous tape then diffusion through the porous tape of the components dissolved in the sample will be a function of their concentration. The higher the concentration of the sample the higher in concentration will be the material being diffused. Thus only a portion of the desired component needs to be diffused to produce a stain on the reagent paper the intensity of which is a measure of the concentration of the substance sought. Thus, if the size of the sample drop placed on the porous tape varies then a stain of varying area will be produced but the intensity of color will be the same for the same concentration.

If the sample resting on the porous tape is now removed by lifting of the porous tape or by wiping or rinsing the sample off with a solvent such as water or alcohol. The concentration of substance in the original sample can be estimated by visual comparison with results obtained from samples of known concentration. As an alternative a beam of light smaller than the area of the stain can be passed through the stain, evaluating its sensitivity by means of a photocell attached to a reading device such as an ammeter or recorder.

The need for confined spots for some determinations can be understood from the following observations: When samples containing 20 μl. of human blood serum and water are placed on a paper tape, the serum will spread normally to about 17 mm. and the water to about 20 mm. For this reason, aqueous solutions cannot be compared with serum. The same quantity of serum or water can be confined in a confined spot circle of about 15 mm. diameter. The 15 mm. spot keeps them spread equally and distributes their contents over an equal area. When the water contains a measured amount of sugar, the sugar content of the serum can be compared with the sugar content of the water by comparing the intensity of the stain produced. The confining circles can be made of wax, polyethylene, glyptal resin, urea formaldehyde resin, C-oil polymer or other suitable plastic that is hydrophobic. Since the confined spot is smaller than the area over which the sample would spread normally, the confined spot acts as a container for a liquid which when laced on the porous tape permits the diffusion of the desired substance through the porous tape to the reagent tape.

For the purpose of giving those skilled in the art a better understanding of the invention, the following illustrative examples are given:

General procedure used

Twenty microliters of the sample mentioned, e.g., blood serum or blood were placed on the porous tape. This is done either by blowing the sample from an ultramicro pipet and touching it to the spot or from an automatic device as shown in the drawing. The instrument is started and travels a short distance, about 1½ inches and stops. A second sample is then blown or dropped on the tape. This continues until all the samples have been added. The instrument continues to move until the tape strip emerges with the samples thereon which have been processed and spots are read.

Tape construction

When separate tapes are used, the porous tape is made of cellophane, cellulose acetate or cellulose nitrate of 0.1 to 1 mil in thickness. This is untreated and in this condition, permits smaller molecules such as water, sugar and salts to pass through, but not macro-molecules such as protein. To pass larger molecules such as proteins, porous tape may be perforated cellophane, polyethylene, Teflon, cellulose acetate or polypropylene or a closely woven nylon cloth. The bottom tape is made of paper 1½ inches wide. This may be backed with a layer of polyethylene to give it wet strength. Other tapes tested as the bottom test tape were paper tapes with cotton thread woven in them and paper tapes impregnated with plastic on both edges of the paper to a distance of ¼ inch, leaving the center inch untouched. All were found satisfactory. A closely woven cloth made of cotton was also tried and found satisfactory as the test tape.

Example I.—Glucose in blood serum (enzymatically)

To 200 ml. of N/10 phosphate buffer, pH 7, add 10 mg. of horseradish peroxidase and 250 m. of glucose oxidase. Shake until dissolved. Now add 1 ml. of a 16% O-dianisidine solution in water and mix. Filter this solution and impregnate the test paper with it. Air dry the paper. Add 0.02 ml. of human blood to the porous tape surface which is on top of the test tape, from the automatic feeding device of FIGURE 2 or from an ultramicro pipet. The porous tape in this case is untreated cellophane, or cellulose acetate as shown in FIGURE 1. The transfer zone is maintained at a temperature of 37° C. in this case. Contact time in the transfer zone is two minutes. The tape is heated in the treating zone at 70° C. to stop the reaction. The sample is washed off the tape at the wash station and then dried at the drying station if the bonded tape of FIGURE 1 is used. If the tapes are separate as in FIGURE 3, the washing and drying is dispensed with and the top tape is lifted off thus removing the sample. The dried bonded tape or the test tape now passes the densitometer so that the concentration of glucose in the sample can be evaluated. The filter used in the densitometer has a transmission maximum of 395 m$\mu$. The height of the peaks on the recording chart are a measure of the glucose concentration.

Example II.—Glucose in blood serum (by chemical means)

A 1% solution of potassium ferricyanide is acidified to a pH of 4 with dilute phosphoric acid. The test paper is dipped in this soluxtion and air dried. Serum (0.02 ml.) is added to the tape and the procedure followed as in Example I, using cellophane (0.8 mil) as the intermediate tape. Diffusion time is two minutes at 37°. The filter used in the densitometer is a 540 m$\mu$ filter. The drying oven in the treating zone in this case is heated at 85° C. to develop a blue color. For this procedure as an alternative the instrument of FIGURE 3a is used. In this case the test tape is allowed to remain moist (not dried) before it comes in contact with the porous tape. In this procedure the lower tape is heated at 90° C. to complete the reaction and to dry the test tape after the porous tape has been removed and before it is read in the densitometer.

Example III.—Carbon dioxide in blood

In this case a porous tape is used which allows gases to go through but not proteins. Salts and water can go through but more slowly than the gases. Such a tape can be most readily made from porous Teflon (0.1 mil in thickness) and also cellulose acetate. The instrument of FIGURE 3 may be used for this purpose. In this case the lower tape is moistened with a solution containing phenolphthalein with a 5/1000 M phosphate buffer of pH 8.0. The lower tape remains moist and is not dried. The sample in the form of a large drop is placed on the porous tape which is touching and above the net test tape. The carbon dioxide passes through the porous tape and decreases the intensity of the pink phenolphthalein by acidification. The Teflon tape is lifted off the test tape and the decrease in intensity is a measure of the carbon dioxide content. Other indicators such as phenol sulfone phthalein can be used in a similar manner.

Example IV.—Protein in blood or plasma

In this case a cellulose acetate micro pore tyne of tape is suitable. A similar tape can be made from Teflon, polyethylene, cellophane, cellulose nitrate, styrene or polyvinylchloride polymers. In this case the pores are of a diameter which allow plasma protein molecules to pass but not red blood cells.

The whole blood or plasma is placed on the porous tape which is above and touching the test tape. The test tape is melted with an alkaline buffer at pH 10.5. After contact for 5 minutes the top tape is lifted. The test tape is now sprayed with a dilute solution of phosphotungstic acid. The test tape now goes through the heating zone at 80° C. for 5 minutes and then dried at 95° C. The blue spots are read on the densitometer using a green filter for the protein content.

Example V.—Preparing the bonded tape

The bonded tape may be made by making a dilute solution of cellulose acetate in ethylene dichloride. The solution is sprayed evenly and lightly on one side of a tape made of Whatman #3 filter paper as a sample paper. On drying a film of porous cellulose acetate covers one side of the paper. A dilute solution of cellulose nitrate or a mixture of cellulose nitrate and cellulose acetate in methyl Cellosolve may be used in the same way or by painting in a thin film (of the order of 0.1 mil in thickness) on one side of the paper. If carefully done the test paper does not lose its absorbent qualities.

In another procedure a film of cellulose acetate, slightly wider than the porous test tape is fed into a pressing device so that the porous tape covers one side of the test tape completely and folds over the edges of the test tape. Applying heat and pressure a bond is formed so that a bonded tape is available with a porous tape bonded to a test tape (in one case cited Whatman #3 paper).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. A device for the automatic analysis of fluids for their chemical components, comprising in combination: means for dispensing a liquid sample in the form of a drop on a tape combination, said tape combination including a transparent porous portion travelling with and in close contact with an absorbent tape, said absorbent tape having been impregnated with a reagent for producing a color reaction with the component of the sample sought, a transfer station maintained at constant temperature through which the drop of sample supported on said porous tape passes and in which station said drop and said tapes moves for a fixed period of time, the component for assay passing through said porous tape to said reagent containing absorbent tape, a washing station where water flows over the porous tape to remove the spent sample, a drying station where warm dry air dries the tape combination and a readout station where a beam of collimated monochromatic light passes through said tape combination and a sensing device to a recorder for recording the light characteristics.

2. A device as claimed in claim 1, wherein said means for dispensing a liquid sample includes a dispensing station including means thereat to hold at least one capillary tube in the horizontal position and tilting means to tilt said capillary tube to the substantially vertical position so as to dispense a drop on said tape combination.

3. A device for the automatic chemical analysis of fluids for their components, comprising, in combination: means for dispensing a liquid sample in the form of a drop on a tape combination, said tape combination including a porous portion travelling with and in close contact with an absorbent tape, means for continously impregnating said absorbent tape with a reagent for producing a color reaction with the component of the sample sought, a transfer station maintained at constant temperature through which the drop of sample supported and said porous tapes moves for a fixed period of time, the component for assay diffusing through said porous tape to said reagent containing absorbent tape, a separation station where the porous tape is removed from the absorbent tape, and a drying station whereat warm dry air blows over the absorbent tape, said absorbent tape then passing through a densitometer where the intensity of color produced is evaluated by means of a combination of a collimated light source, a photo sensing device and a signal recorder.

4. A device as claimed in claim 3, wherein said means for dispensing a liquid sample includes a dispensing station including means thereat to hold at least one capillary tube in the horizontal position and tilting means to tilt said capillary tube to the vertical position so as to dispense a drop on said tape combination.

References Cited

UNITED STATES PATENTS

| | | | |
|---|---|---|---|
| 3,036,893 | 5/1962 | Natelson | 23—230 |
| 3,092,465 | 6/1963 | Adams et al. | 23—253 |
| 3,261,668 | 7/1966 | Natelson | 23—253 |

JAMES H. TAYMAN, JR., *Primary Examiner.*